US005518539A

United States Patent [19]

Hao et al.

[11] Patent Number: 5,518,539

[45] Date of Patent: May 21, 1996

[54] PROCESS FOR THE PREPARATION OF SYNERGISTIC PIGMENT MIXTURES

[75] Inventors: Zhimin Hao, Marly; Abul Igbal, Arconciel; John S. Zambounis, Murten; Bernhard Medinger, Giffers, all of Switzerland

[73] Assignee: Ciba-Geigy Corporation, Ardsley, N.Y.

[21] Appl. No.: 341,720

[22] Filed: Nov. 18, 1994

[30] Foreign Application Priority Data

Nov. 22, 1993 [CH] Switzerland ........................ 3477936

[51] Int. Cl.$^{6}$ .................................................. C09B 67/52

[52] U.S. Cl. ........................ 106/495; 106/494; 106/496; 106/497; 106/498

[58] Field of Search ................................... 106/494, 495, 106/496, 497, 498

[56] References Cited

U.S. PATENT DOCUMENTS

| | | | |
|---|---|---|---|
| 3,160,510 | 12/1964 | Ehrich | 106/495 |
| 3,298,847 | 1/1967 | Hanke et al. | 106/495 |
| 3,647,494 | 3/1972 | Ehrich et al. | 106/495 |
| 3,681,100 | 8/1972 | Jaffe | 106/495 |
| 3,776,749 | 12/1973 | McKay et al. | 106/496 |
| 4,322,303 | 3/1982 | Rosenberger | 252/46.6 |
| 4,720,305 | 1/1988 | Iqbal et al. | 106/494 |
| 4,783,540 | 11/1988 | Bäbler | 548/453 |
| 4,810,304 | 3/1989 | Jaffe et al. | 106/494 |

FOREIGN PATENT DOCUMENTS

| | | |
|---|---|---|
| 0027776 | 4/1981 | European Pat. Off. . |
| 2009073 | 9/1970 | Germany . |
| 3436209 | 4/1986 | Germany . |
| 3436208 | 4/1986 | Germany . |
| 3436206 | 4/1986 | Germany . |

OTHER PUBLICATIONS

Derwent 64736R–E6 of NL 7001362, Jan. 9, 1970.
Derwent 86–094956/15 of DE 436209 Apr. 1986.
Derwent 86–095312/15 of DE 436208 Apr. 1986.
Derwent 86–094955/15 of DE 3436206 Apr. 1986.

*Primary Examiner*—Mark L. Bell
*Assistant Examiner*—Scott L. Hertzog
*Attorney, Agent, or Firm*—Michele A. Kovalesk

[57] ABSTRACT

The present invention relates to a process for the preparation of synergistic pigment mixtures by mixing solutions of at least two pigments solubilized by introducing carbamate groups, and subsequently precipitating the mixture in pigment form by subjecting said mixture to a thermal, photolytic or chemical treatment, either before or after incorporation in the substrate to be pigmented.

6 Claims, No Drawings

PROCESS FOR THE PREPARATION OF SYNERGISTIC PIGMENT MIXTURES

It has long been known from the relevant literature that specific pigment properties can be enhanced, including both coloristic as well as fastness properties, by mixing different pigments of the same or also essentially related pigment classes. In certain cases so-called solid solutions or mixed crystals are formed. For example, solid solutions of quinacfidones, quinacfidonequinones and/or dehydroquinacridones that are distinguished by superior fastness properties and, in particular, by special coloristic properties, are disclosed in U.S. Pat. Nos. 3,160,510, 3,298,847, 3,647,494 and 3,681,100. U.S. Pat. No. 3,776,749 discloses mixtures of azo pigments and soluble azo dyes which have unexpectedly high tinctoffal strength and transparency. Mixtures of two or more perylenetetracarbodiamides with improved lightfastness and transparency compared with the individual components are disclosed in DE-A 2 009 073, and DE-A 3 436 206, 3 436 208 and 3 436 209 disclose mixed crystals of different perylenetetracarbodiimides which are distinguished by their heat resistance. U.S. Pat. No. 4,720,305 discloses pigment mixtures of different diketopyrrolopyrroles which, compared with the individual components, have enhanced pigment properties. Solid solutions of different diketopyrrolopyrrole pigments and of diketopyrrolopyrrole pigments and quinacridones are disclosed in U.S. Pat. No. 4,783,540 and 4,810,304. In both cases the products in question have enhanced pigment properties compared with the individual components.

It has now been found that the same pigment mixtures, solid solutions or mixed crystals exhibiting surprisingly even more enhanced properties can be obtained by solubilising the individual components beforehand by introducing carbamate groups into the pigment molecules, subsequently dissolving said components in a suitable solvent and mixing them in solution, and finally precipitating the components again in the form of a pigment mixture, solid solution or mixed crystals from the dissolved mixture by means of a thermal, photolytic or chemical treatment.

Accordingly, the invention relates to a process for the preparation of synergistic mixtures of at least two different pigments of the quinacfidone, anthraquinone, perylene, indigo, quinophthalone, isoindolinone, isoindoline, dioxazine, phthalocyanine, diketopyrrolopyrrole or azo series, which comprises mixing at least two compounds of formula $$A(B)_x, \qquad (I),$$

wherein x is an integer from 1 to 4,

A is the radical of a chromophore of the quinacridone, anthraquinone, perylene, indigo, quinophthalone, isoindolinone, isoindoline, dioxazine, phthalocyanine, diketopyrrolopyrrole or azo series, which contains x N-atoms linked to B, preferably with at least one directly adjacent or conjugated carbonyl group, B is a group of formula

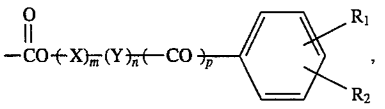

(II)

$$-\overset{\overset{O}{\|}}{C}O\!-\!(X)_m\!-\!(Z)_n\!-\!Q \text{ or} \qquad (III)$$

-continued $$-\overset{\overset{O}{\|}}{C}O\!-\!N(R_3)(R_4), \qquad (IV)$$

and, when x is 2, 3 or 4, may also be one, two or three hydrogen atoms, in which formulae II, III and IV m, n and p are each independently of one another 0 or 1, X is $C_1$-$C_{14}$alkylene or $C_2$-$C_8$alkenylene, Y is a group-V-$(CH_2)_q$—, Z is a group -V-$(CH_2)_r$—, V is $C_3$-$C_6$cycloalkylene, q is an integer from 1 to 6, and r is an integer from 0 to 6, $R_1$ and $R_2$ are each independently of the other hydrogen, $C_1$-$C_6$alkyl, $C_1$-$C_4$alkoxy, halogen, CN, $NO_2$, unsubstituted phenyl or phenoxy or phenyl or phenoxy which are substituted by $C_1$-$C_4$alkyl, $C_1$-$C_4$alkoxy or halogen, Q is hydrogen, CN, $Si(R_1)_3$, a group $C(R_5)(R_6)(R_7)$, wherein $R_5$, $R_6$ and $R_7$ are each independently of one another hydrogen or halogen and at least one of $R_5$, $R_6$ and $R_7$ is halogen, a group

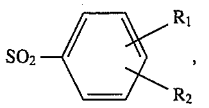

wherein $R_1$ and $R_2$ are as defined above, a group $SO_2R_8$ or $SR_8$, wherein $R_8$ is $C_1$-$C_4$alkyl, a group $CH(R_9)_2$, wherein $R_9$ is unsubstituted phenyl or phenyl which is substituted by $C_1$-$C_4$alkyl, $C_1$-$C_4$alkoxy or halogen, or a group of formula

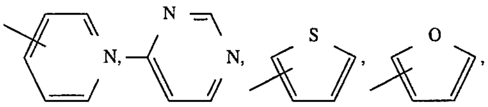

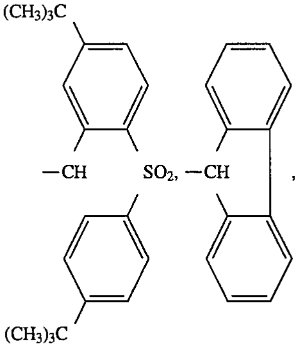

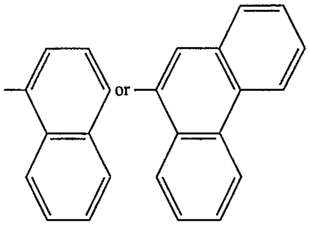

$R_3$ and $R_4$ are each independently of the other hydrogen, $C_1$-$C_{18}$alkyl, a group

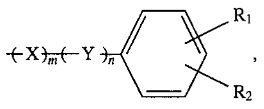

wherein X, Y, $R_1$, $R_2$, m and n are as defined above, or $R_3$ and $R_4$, together with the linking nitrogen atom, form a pyrrolidinyl, piperidinyl or morpholinyl radical, in powder form by conventional methods and dissolving the mixture in an organic solvent, or first dissolving the individual components in an organic solvent and mixing the solutions, and subsequently precipitating the pigment mixture consisting of the corresponding pigments of formula $$A(H)_x,$$

wherein A and x have the meanings given above, from the dissolved mixture by means of a thermal, photolyric or chemical treatment.

A is the radical of known chromophores having the basic structure $$A(H)_x,$$

for example

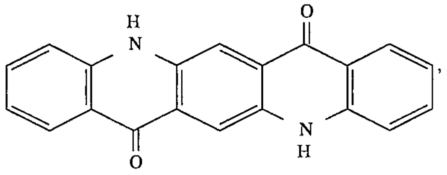

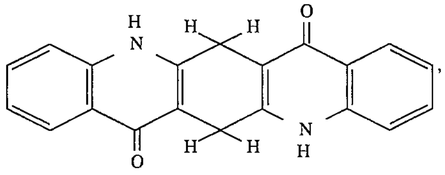

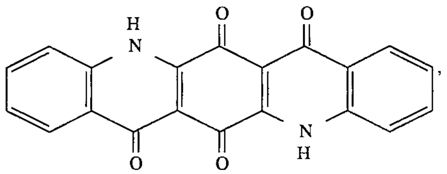

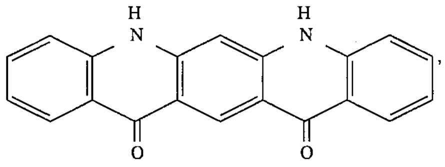

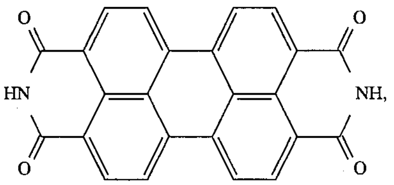

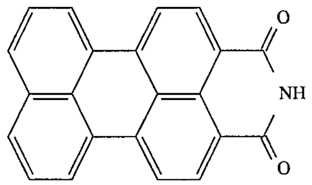

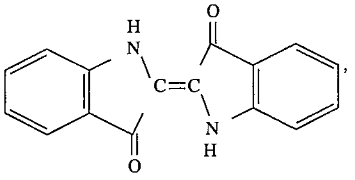

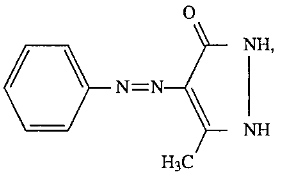

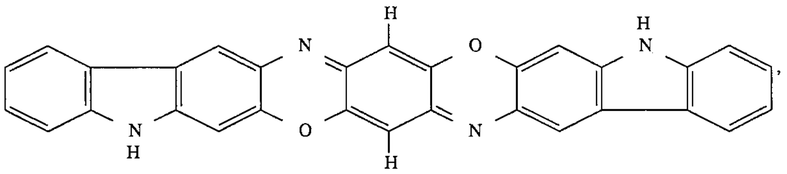

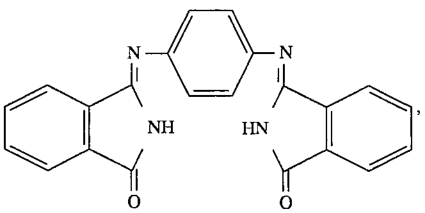

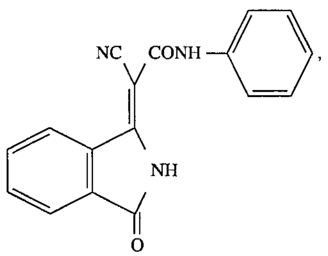

-continued
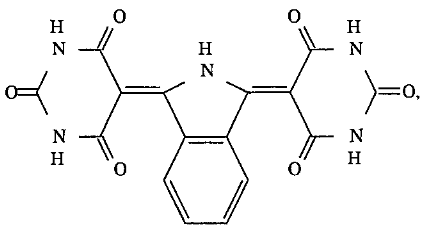
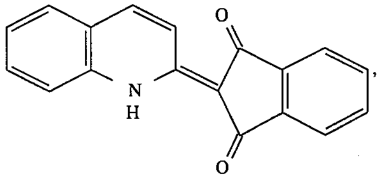
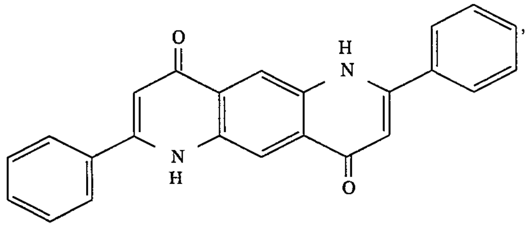
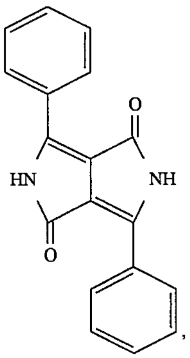
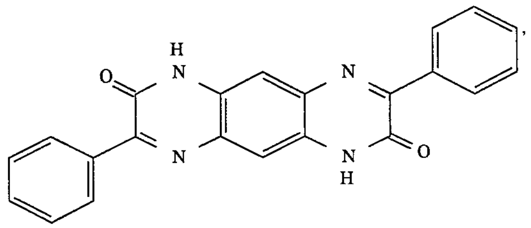
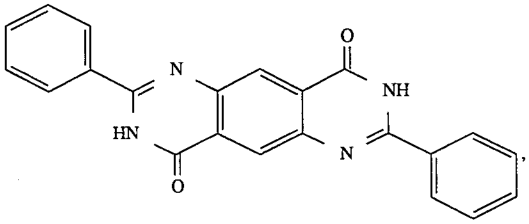
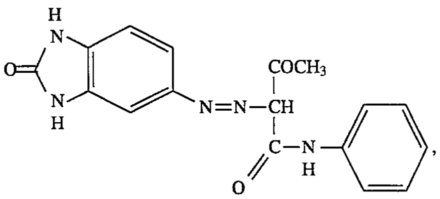
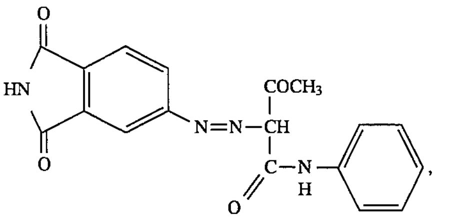
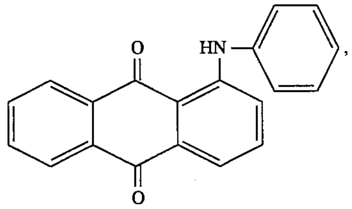
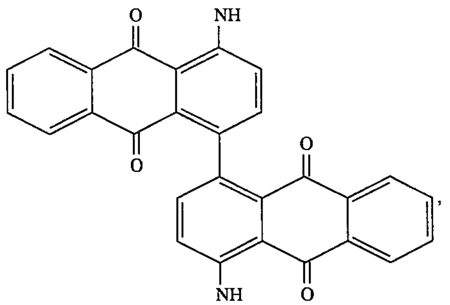

-continued

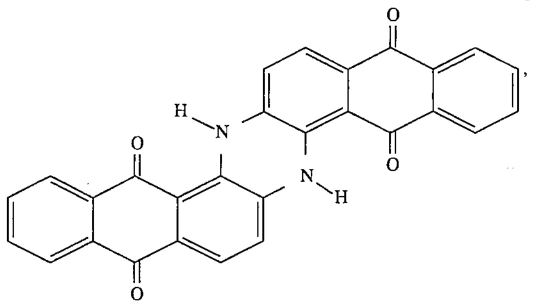

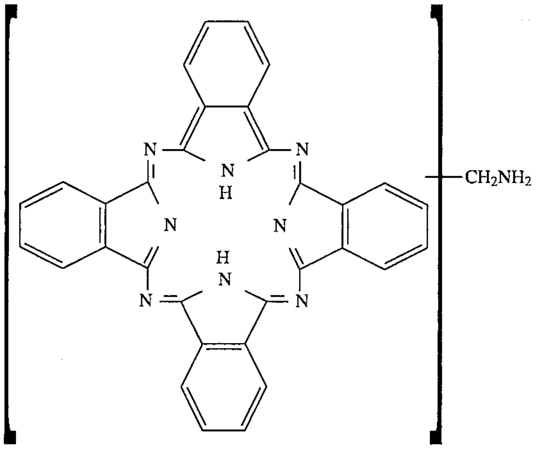

and all known derivatives thereof.

X in the significance of $C_1$-$C_{14}$alkylene is straight-chain or branched alkylene, typically methylene, dimethylene, trimethylene, 1-methylmethylene, 1,1-dimethylmethylene, 1,1 -dimethyldimethylene, 1,1 -dimethyltrimethylene, 1 -ethyldimethylene, 1-ethyl- 1 -methyldimethylene, tetramethylene, 1,1 -dimethyltetramethylene, 2,2-dimethyltrimethylene, hexamethylene, decamethylene, 1,1-dimethyldecamethylene, 1,1-diethyldecamethylene or tetradecamethylene.

X in the significance of $C_2$-$C_8$alkenylene is straight-chain or branched alkenylene, typically vinylene, allylene, methallylene, 1-methyl-2-butenylene, 1,1-dimethyl-3-butenylene, 2-butenylene, 2-hexenylene, 3-hexenylene or 2-octenylene.

Halogen substituents may be iodo, fluoro, preferably bromo and, most preferably, chloro.

$C_1$-$C_6$Alkyl will typically be methyl, ethyl, n-propyl, isopropyl, n-butyl, sec-butyl, tert-butyl, n-amyl, tert-amyl, hexyl, and $C_1$-$C_{18}$alkyl may additionally be heptyl, octyl, 2-ethylhexyl, nonyl, decyl, dodecyl, tetradecyl, hexadecyl or octadecyl.

$C_1$-$C_4$Alkoxy is typically methoxy, ethoxy, n-propoxy, isopropoxy or butoxy. $C_3$-$C_6$Cycloalkylene is typically cyclopropylene, cyclopentylene and, preferably, cyclohexylene.

Particularly interesting compounds of formula I for carrying out the inventive process are those compounds wherein x is 1 or 2 and B is a group of formula

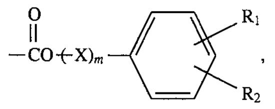

(V)

$$-\overset{O}{\overset{\|}{C}}O-X-Q$$

(VI) or (IV)

and, if x is 2, may also be one hydrogen atom, and in formulae IV, V and VI m is 0 or 1, X is $C_1$-$C_4$ alkylene or $C_2$-$C_5$alkenylene, $R_1$ and $R_2$ are each independently of the other hydrogen, $C_1$-$C_4$alkyl, methoxy, chloro or $NO_2$, and Q is hydrogen, CN, $CCl_3$, a group

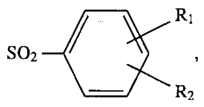

$SO_2CH_3$ or $SCH_3$, $R_3$ and $R_4$ are each independently of the other hydrogen, $C_1$-$C_4$alkyl or a group

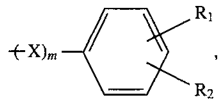

or $R_3$ and $R_4$, taken together, form a piperidinyl radical, and preferably those wherein x is 2 and B may be twice a group of formula

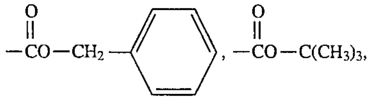

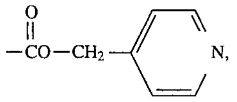

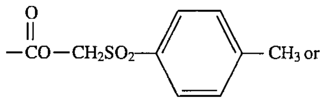

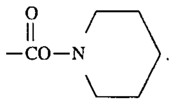

Preferred compounds of formula I are a) perylenecarboximides of formula

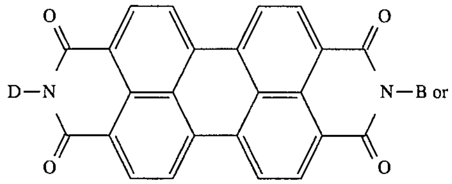

(VIIa)

-continued (VIIb)

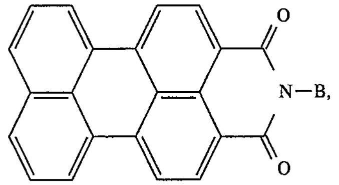

wherein D is hydrogen, $C_1$-$C_6$alkyl, unsubstimted or halogen- or $C_1$-$C_4$alkyl-substituted phenyl, benzyl or phenethyl, or is B, b) quinacridones of formula (VIII)

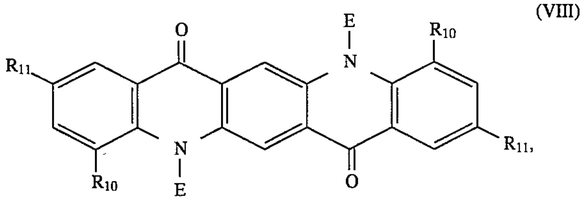

wherein $R_{10}$ and $R_{11}$ are each independently of the other hydrogen, halogen, $C_1$-$C_{18}$alkyl, $C_1$-$C_4$alkoxy or phenyl, c) dioxazines of formula (IX)

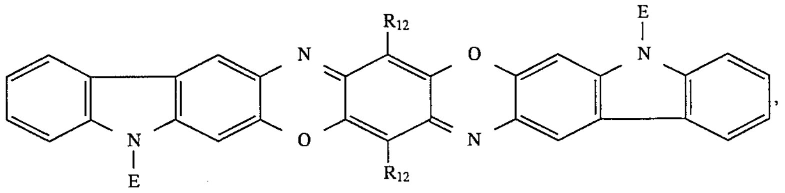

wherein $R_{12}$ is hydrogen, halogen or $C_1$-$C_{18}$alkyl, d) isoindolines of formulae

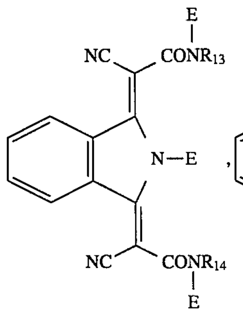

(X)

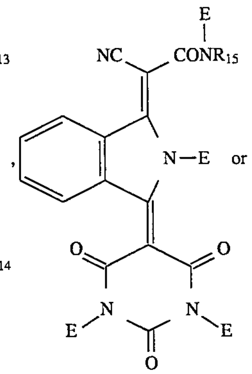

(XI)

-continued

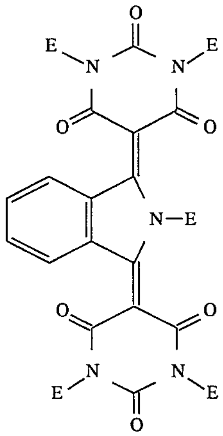

(XII)

wherein $R_{13}$ is a group

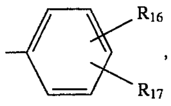

$R_{14}$ is hydrogen, $C_1$-$C_{18}$alkyl, benzyl or a group

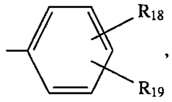

$R_{15}$ has the same meaning as $R_{13}$, $R_{16}$, $R_{17}$, $R_{18}$ and $R_{19}$ are each independently of one another hydrogen, $C_1$-$C_{18}$alkyl, $C_1$-$C_4$alkoxy, halogen or trifluoromethyl, e) indigo derivatives of formula (XIII)

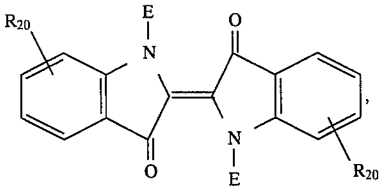

wherein $R_{20}$ is hydrogen, CN, $C_1$-$C_4$alkyl, $C_1$-$C_4$alkoxy or halogen, f) azobenzimidazolones of formula (XIV)

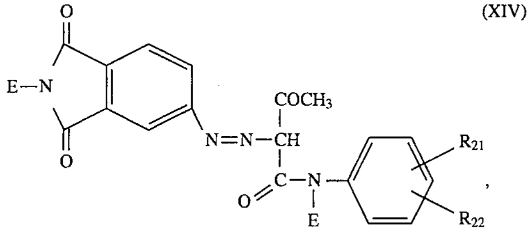

wherein $R_{21}$ and $R_{22}$ are each independently of the other hydrogen, halogen, $C_1$-$C_4$ alkyl or $C_1$-$C_4$alkoxy, g) anthraquinoid compounds of formula (XV)

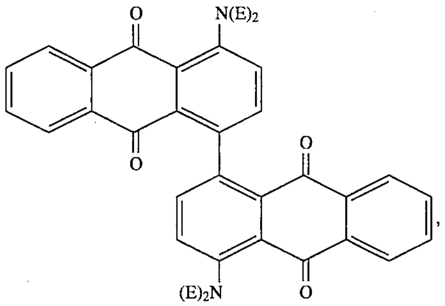

h) phthalocyanines of formula (XVI)

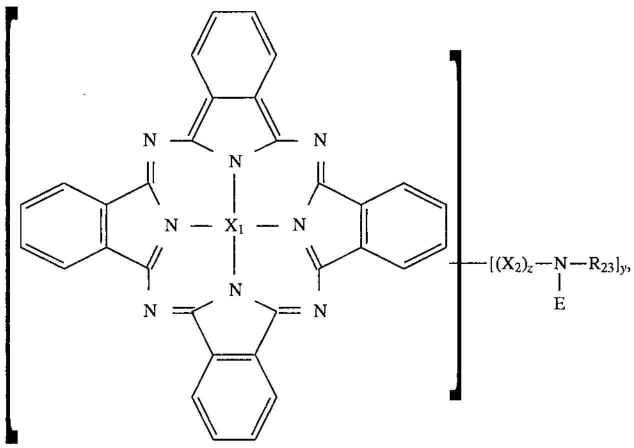

wherein $X_1$ is $H_2$, Zn, Cu, Ni, Fe or V, $X_2$ is —CH($R_{24}$)— or —$SO_2$—

$R_{23}$ is hydrogen, $C_1$-$C_4$alkyl, —N(E)$R_{24}$, —NHCO$R_{25}$, —CO$R_{25}$ or

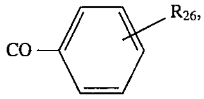

$R_{24}$ is hydrogen or $C_1$-$C_4$alkyl, $R_{25}$ is $C_1$-$C_4$alkyl and $R_{26}$ is hydogen, halogen, $C_1$-$C_4$alkyl or $C_1$-$C_4$alkoxy, z is 0 or 1 and y is an integer from 1 to 4, and i) pyrrolo[3,4-c]pyrroles of formula (XVII)

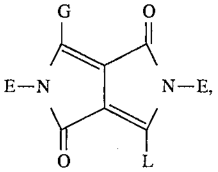

wherein G and L are each independently of the other a group of formula

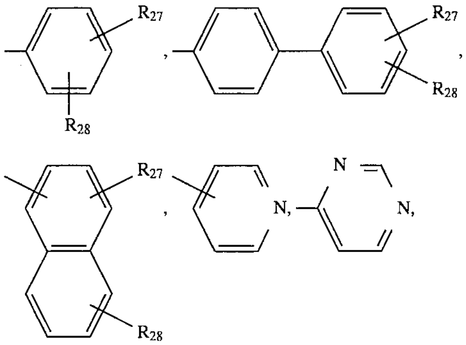

-continued

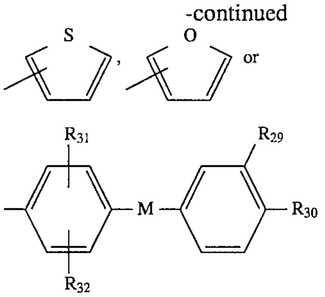

wherein $R_{27}$ and $R_{28}$ are each independently of the other hydrogen, halogen, $C_1$-$C_{18}$alkyl, $C_1$-$C_{18}$alkoxy, $C_1$-$C_{18}$alkylmercapto, $C_1$-$C_{18}$alkylamino, —CN, —$NO_2$, phenyl, trifluoromethyl, $C_5$-$C_6$cycloalkyl, —C=N—($C_1$-$C_{18}$alkyl),

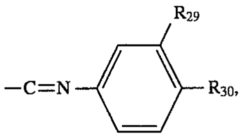

imidazolyl, pyrrazolyl, triazolyl, piperazinyl, pyrrolyl, oxazolyl, benzoxazolyl, benzothiazolyl, benzimidazolyl, morpholinyl, piperidinyl or pyrrolidinyl, M is —$CH_2$—, —$CH(CH_3)$—, —$C(CH_3)_2$—, —CH=N—, —N=N—, —O—, —S—, —SO—, —$SO_2$— or $NR_{33}$, $R_{29}$ and $R_{30}$ are each independently of the other hydrogen, halogen, $C_1$-$C_6$alkyl, $C_1$-$C_{18}$alkoxy or —CN, $R_{31}$ and $R_{32}$ are each independently of the other hydrogen, halogen or $C_1$-$C_6$alkyl and $R_{33}$ is hydrogen or $C_1$-$C_6$alkyl, in each of which formulae E is hydrogen or is B, with the proviso that E in each formula is at least one group B and B is as defined above, in respect of which definition the preferred meanings cited above apply.

$R_{27}$ and $R_{28}$ in formula XVII as $C_1$-$C_{18}$alkylmercapto may typically be methylmercapto, ethylmercapto, propylmercapto, butylmercapto, octylmercapto, decylmercapto, hexadecylmercapto or octadecylmercapto; and as $C_1$-$C_{18}$alkylamino may typically be methylamino, ethylamino, propylamino, hexylamino, decylamino, hexadecylamino or octadecylamino.

It is particularly preferred to use quinacridones of formula VHI, wherein $R_{10}$ and $R_{11}$ are each independnetly of the other hydrogen, chloro or methyl, and E is as defined above, and/or pyrrolo[3,4-c]pyrroles of formula XVII, wherein G and L are identical and are a group of formula

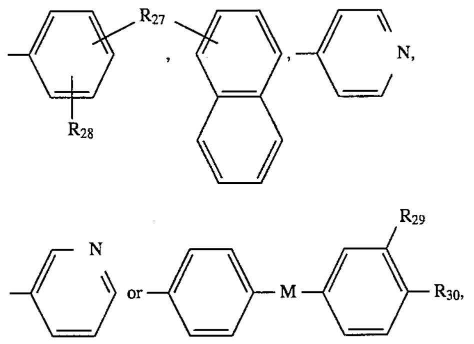

wherein $R_{27}$ and $R_{28}$ are each independently of the other hydrogen, chloro, bromo, $C_1$-$C_4$alkyl, $C_1$-$C_6$alkoxy, $C_1$-$C_6$alkylamino, CN or phenyl, M is —O—, —$NR_{33}$—, —N=N— or —$SO_2$—, $R_{29}$ and $R_{30}$ are hydrogen and $R_{33}$ is hydrogen, methyl or ethyl and E is as defined above.

It is very particularly preferred to use quinacridones of formulae (XVIII)

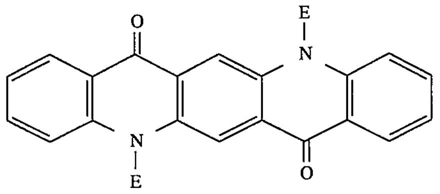

and/or (XIX)

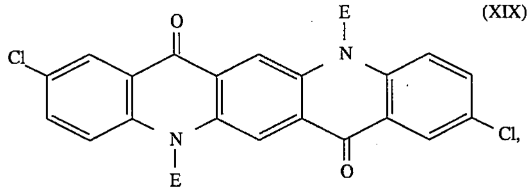

and/or pyrrolo[3,4-c]pyrroles of formula (XX)

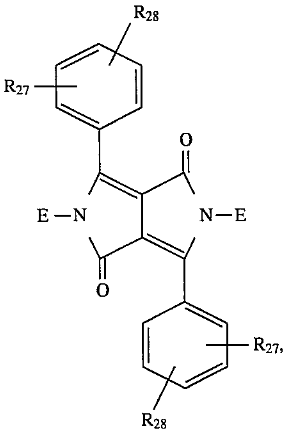

wherein $R_{27}$ and $R_{28}$ are each independently of the other hydrogen, methyl, tert-butyl, chloro, bromo, CN or phenyl, and E in formulae XVIII, XIX and XX is a group of formula

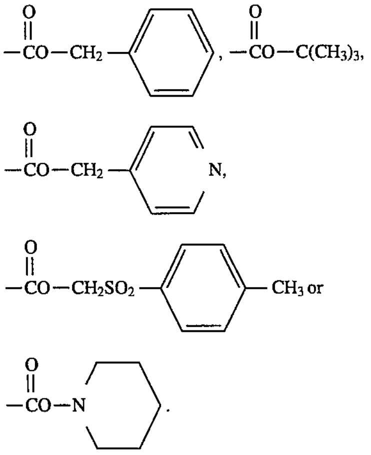

The compounds of formula I can be prepared by methods analogous to known ones, for example by reacting a compound of formula $$A(H)_x, \qquad \text{(XXI)}$$

wherein A and x are as defined above, in the desired molar ratio with a dicarbonate of formula $$B—O—B \quad (XXII)$$

or with a trihaloacetate of formula $$(R_{34})_3C—B \quad (XXIII),$$

or with an azide of formula $$BN_3 \quad (XXIV),$$

or with a carbonate of formula $$B—OR_{35} \quad (XXV),$$

or with an alkylidene-iminooxyformate of formula $$B—O\overset{O}{\overset{\|}{C}}O—N{=}C\begin{matrix} / R_{36} \\ \backslash R_{37} \end{matrix}, \quad (XXVI)$$

wherein B is as defined above, $R_{34}$ is chloro, fluoro or bromo, $R_{35}$ is $C_1$-$C_4$alkyl or unsubstituted phenyl or phenyl which is substituted by halogen, $C_1$-$C_4$alkyl, $C_1$-$C_4$alkoxy or —CN, $R_{36}$ is —CN or —$COOR_{18}$, and $R_{37}$ is unsubstituted phenyl or phenyl which is substituted by halogen, $C_1$-$C_4$alkyl, $C_1$-$C_4$alkoxy or —CN, in an aprotic organic solvent and in the presence of a base as catalyst, conveniently in the temperature range from 0° to 400° C., preferably from 10° to 200° C., for 2 to 80 hours.

It is preferred to react the compound of formula XXI with a dicarbonate of formula XVII.

The compounds of formula XXI, dicarbonates of formula XXII, trihaloacetates of formula XXIH, azides of formulae XXIV, carbonates of formula XXV and alkylidene-iminooxyformates of formula XXVI are known substances. Any that are novel can be prepared by methods analogous to standard known ones.

The respective molar ratio of the compound of formula XXI and the compounds of formulae XXII–XXVI will depend on the meaning of x, i.e. on the number of groups B to be introduced. Preferably, however, the compounds of formulae XXII–XXVI will be used in a 2- to 10-fold excess.

Suitable organic solvents are typically ethers such as tetrahydrofuran or dioxane, or glycol ethers such as ethylene glycol methyl ether, ethylene glycol ethyl ether, diethylene glycol monomethyl ether or diethylene glycol monoethyl ether, and also dipolar aprotic solvents such as acetonitrile, benzonitrile, N,N-dimethylformamide, N,N-dimethylacetamide, nitrobenzene, N-methylpyrrolidone, halogenated aliphatic or aromatic hydrocarbons such as trichloroethane, benzene or alkyl-, alkoxy- or halogen-substituted benzene, typically including toluene, xylene, anisole or chlorobenzene, or aromatic N-heterocycles such as pyridine, picoline or quinoline. Preferred solvents are typically tetrahydrofuran, N,N-dimethylformamide and N-methylpyrrolidone. The cited solvents may also be used as mixtures. It is convenient to use 5–20 parts by weight of solvent to 1 part by weight of reactant.

Bases suitable as catalysts are typically the alkali metals themselves, conveniently lithium, sodium or potassium and the hydroxides and carbonates thereof, or alkali metal amides such as lithium, sodium or potassium amide, or alkali metal hydrides such as lithium, sodium or potassium hydride, or alkaline earth metal or alkali metal alcoholates which are derived in particular from primary, secondary or tertiary aliphatic alcohols of 1 to 10 carbon atoms, for example lithium, sodium or potasssium methylate, ethylate, n-propylate, isopropylate, n-butylate, sec-butylate, tert-butylate, 2-methyl-2-butylate, 2-methyl-2-pentylate, 3-methyl-3-pentylate, 3-ethyl-3-pentylate, and also organic aliphatic aromatic or heterocyclic N-bases, typically including diazabicyclooctene, diazabicycloundecene and 4-dimethylaminopyridine and trialkylamines such as trimethylamine or triethylamine. A mixture of the cited bases may also be used.

The organic nitrogen bases are preferred, for example diazabicyclooctene, diazabicycloundecene and preferably, 4-dimethylaminopyridine.

The reaction is preferably carried out in the temperature range from 10° to 100° C., most preferably from 14 to 40° C, and under atmospheric pressure.

For carrying out the inventive process, the compounds of formula I are mixed either by standard known methods in powder form in the desired ratio and the mixture is dissolved in the solvent, or they are first dissolved in the solvent individually and the solutions are mixed in the desired milo.

The following solvents may conveniently be used: ethers such as tetrahydrofuran or dioxane, or glycol ethers such as ethylene glycol methyl ether, ethylene glycol ethyl ether, diethylene glycol monomethyl ether or diethylene glycol monoethyl ether; polyalcohols such as polyethylene glycol, ketones such as acetone, ethyl methyl ketone, isobutyl methyl ketone or cyclohexanone; also dipolar aprotic solvents such as acetonitrile, benzonitrile, N,N-dimethylformamide, N,N-dimethylacetamide, nitrobenzene, N-methylpyrrolidone, dimethyl sulfoxide, halogenated aliphatic or aromatic hydrocarbons such as trichloroethane, dichloromethane, chloroform, benzene or alkyl-, alkoxy- or halogen-substituted benzene, e.g. toluene, xylene, anisole or chlorobenzene; aromatic N-heterocycles such as pyridine, picoline or quinoline or high-boiling solvents such as decaline, n-dodecane or kerosine or mixtures thereof. Preferred solvents typically include toluene, diphenyl ether, N-methylpyrrolidone, N,N-dimethylformamide, dimethyl sulfoxide and quinoline.

The concentration of compounds of formula I in the solvent or solvent system can vary greatly, depending on the solvent. It is expedient to use 0.1 to 20% by weight of compound of formula I, based on the entire solution, and preferably 0.2 to 5% by weight.

The pigment mixture consisting of the pigments based on the compounds of formula I can be precipitated from the solution in the simplest manner, either by subjecting the dissolved mixture a) to a thermal treatment, i.e. by heating to the temperature range from 50° to 400° C., preferably from 100° to 200° C., or by applying laser radiation, b) to a photolytic treatment, i.e. exposure to wavelengths below 375 nm, or c) to a chemical treatment, i.e. with an organic or inorganic acid, conveniently acetic acid, toluenesulfonic acid, trifluoroacetic acid, hydrochloric acid or sulfuric acid, and isolating the precipitated product by conventional methods.

As the compounds of formula I are usually soluble in the high molecular weight organic materials to be coloured, said materials can also be used as solvent. Accordingly, at least two different compounds of formula I, either singly or in admixture, can also be incorporated and dissolved in the high molecular weight organic material to be coloured, i.e. in plastics, paint systems or printing ink systems, by conventional methods, and the pigment mixture precipitated in situ by one of the methods referred to above.

The ratio of the compounds of formula I comprising the mixture can vary very greatly and is also dependent on the desired shade. In two component mixtures, the ratio of the two components is conveniently 50–95:5–50% by weight, preferably 65–90:10–35% by weight.

The pigment mixtures obtained by the process of this invention, when isolated from the solution and subsequently incorporated in the material to be coloured, as well as when precipitated in situ, i.e. in the substrate, are distinguished by very superior and, compared with conventionally prepared mixtures, altogether enhanced properties, including both colofistic properties such as shade, purity of shade, colour strength, brilliance and transparency, as well as fastness properties such as fastness to light, weathering, migration and heat.

Given the appropriate choice of components and mixture ratios, it is also possible to obtain solid solutions, especially when components and mixture ratios are chosen that result in the formation of solid solutions by conventional methods in known manner. The process of this invention can also, however, lead to the formation of solid solutions in cases in which solid solutions are not obtained by conventional methods.

Solid solutions can be charactefised by their X-ray diffraction pattern differing from that of the physical mixture of both single components. The X-ray diffraction pattern of the solid solutions of this invention is charactefised by lines differing from the sum of the X-ray diffraction patterns of the single components.

The invention is illustrated by the following Examples.

Example 1:a) 27.94 g (0.128 mol) of dii-tert-butyldicarbonate are added in 3 portions at hourly intervals to a mixture of 14.75 g (0.0512 mol) of 1,4-diketo-3,6-diphenylpyrrolo[ 3,4-c]pyrrole and 3.23 g (0.0264 mol) of 4-dimethylaminopyridine in 500 ml of tetrahydrofuran (dried over a molecular sieve). The resultant red suspension is stirred for 2 hours at room temperature, with the exclusion of atmospheric moisture. A dark green solution is obtained. The solvent is distilled off under reduced pressure. The yellow residue is washed with a 5% aqueous solution of sodium hydrogencarbonate, then rinsed off with water and dried under vacuum, affording 24.5 g (98% of theory) of N,N'-di-tert-butoxycarbonyl- 1,4-diketo-3,6-diphenylpyrrolo[ 3,4-c]pyrrole.

Analysis:

$^{1}$H-NMR ($CDCl_3$): 7.75 (d, 4H); 7.48–7.50 (m, 6H); 1.40 (s, 18H).

b) 24.29 g (0.111 mol) of di-tert-butyldicarbonate are added to a mixture of 8.44 g (0.021 mol) of 1,4-diketo-3,6-di-(4-tert-butylphenyl)-pyrrolo[3,4-c]pyrrole and 1.49 g (0.012 mol) of 4-dimethylaminopyridine in 100 ml of N,N-dimethylformamide (dried over a molecular sieve). The resultant red suspension is stirred for 3 hours at room temperature, with the exclusion of atmospheric moisture. The colour changes to orange. The precipitated substance is isolated by filtration, the residue is washed repeatedly with cold distilled water and dried under vacuum at room temperature, affording 11.40 g (90% of theory of) N,N'-di-tert-butoxycarbonyl- 1,4-diketo-3,6-di-(4-tert-butylphenyl)-pyrrolo[ 3,4-c]pyrrole as a brilliant yellow product.

Analysis:

$^{1}$H-NMR ($CDCl_3$): 7.69 (d, 4H); 7.48 (d, 4H); 1.43 (s, 18H); 1.34 (s, 18H).

c) A mixture of 1.77 g of N,N'-di-tert-butoxycarbonyl-1,4-diketo-3,6-diphenylpyrrolo[ 3,4-c]pyrrole (a) and 0.38 g of N,N'-di-tert-butoxycarbonyl-1,4-diketo-3,6-di-( 4-tert-bu-tylphenyl)-pyrrolo[3,4-c]pyrrole (b) is dissolved at room temperature in 100 ml of toluene. With stirring, the clear yellow solution is heated to 60° C. and then 10 ml of trifluoroacetic acid are added. The mixture is heated to 90° C., stirred at this temperature for 20 minutes and then cooled to room temperature. The purple-red solid substance is isolated by filtration, washed first with methanol, then with distilled water and dried at 70° C in a vacuum shelf drier, affording 0.90 g (69.2% of theory) of a product whose purple-red colour differs from that of the original components and of their physical mixture. The X-ray diffraction pattern likewise differs, thereby showing that a solid solution is obtained.

Example 2a): The procedure of Example 1a) is repeated, with the sole exception that 1,4-diketo-3,6-diphenylpyrrolo [3,4-c]pyrrole is replaced by the equivalent amount of 1,4-diketo-3,6-di-(p-tolyl)-pyrrolo[3,4-c]pyrrole, giving N,N'-di-tert-butoxycarbonyl-l,4-diketo- 3,6-di-(p-tolyl)pyrrolo[3,4-c]pyrrole in 94% yield..

Analysis:

$^{1}$H-NMR($CDCl_3$): 7.65 (d, 4H); 7.28 (d, 4H); 2.42 (s, 6H); 1.43 (s, 18H):

b) The procedure of Example 1b) is repeated, with the sole exception that 1,4-diketo-3,6-di-( 4-tert-butylphenyl)pyrrolo [3,4-c]pyrrole is replaced by the equivalent amount of 1,4-diketo-3,6-di-(m-tolyl)pyrrolo[ 3,4-c]pyrrole, giving N,N'-di-tert-butoxycarbonyl- 1,4-diketo- 3,6-di-(m-tolyl)pyrrolo[3,4-c]pyrrole in 92% yield..

Analysis:

$^{1}$H-NMR($CDCl_3$):7.54–7.57 (m,4H);7.29–7.39 (m,4H);2.41(s,6H);1.39 (s, 18H);

c) A mixture of 0.85 g of N,N'-di-tert-butoxycarbonyl-1, 4-diketo-3,6-di-(p-tolyl)-pyrrolo-[ 3,4-c]pyrrole (a) and 0.15 g of N,N'-di-tert-butoxycarbonyl-1,4-diketo-3,6-di-(m-tolyl)-pyrrolo[3,4-c]pyrrole (b) in 500 ml of diphenyl ether is stirred for 1 hour at 40° C. and then added dropwise, with efficient stirring, to 20 ml of diphenyl ether preheated to 220° C. The red suspension is stirred for 30 minutes at 220° C. and then cooled to 60° C. The precipitated product is isolated by filtration, washed first with methanol, then with distilled water and dried in a vacuum shelf drier, affording 0.55 g (98% of theory) of a product whose X-ray diffraction pattern differs from that of the original components, thereby showing that a solid solution is obtained.

Example 3a): 6.0 g (0.0275 mol) of di-tert-butyldicarbonate are added to a mixture of 1.8 g (0.00576 mol) of quinacridone and 0.3 g (0.00246 mol) of 4-dimethylaminopyridine in 90 ml of N,N-dimethylformamide. The resultant violet suspension is stirred overnight at room temperature, with the exclusion of atmospheric moisture. The colour changes to yellow-orange. With stirring, the reaction mixture is poured into 100 ml of distilled water. The yellow precipitate is isolated by filtration and the residue is washed with distilled water and dried, giving 2.8 g (95% of theory) of N,N'-di-tert-butoxycarbonylquinacridone.

Analysis:

$^{1}$H-NMR($CDCl_3$):8.74 (s,2H);8.41 (d,2H);7.84 (d,2H); 7.72 (t,2H);7.38 (t,2H);1.75 (s 18H).

b) A mixture of 0.26 g of N,N'-di-tert-butoxycarbonyl-1, 4-diketo-3,6-diphenylpyrrolo-[ 3,4-c]pyrrole (prepared according to Example 1a) and 2.50 g of N,N'-di-tert-butoxycarbonylquinacridone (a) in 100 ml of toluene is heated, with stirring, to 80° C. With good stirring, 2.58 g of toluene-4-sulfohydrate are then added and the mixture is further heated and stirred for 1 hour at 105° C. The red suspension is cooled to room temperature and filtered. The red residue is washed first with methanol, then with distilled water and dried under vacuum at 60° C., giving 1.68 g of a product whose X-ray diffraction pattern is identical with that of the α-quinacridone, thereby showing the presence of a solid solution of DPP in quinacridone.

Examples 4–11: The procedure of Example 1 is repeated, but replacing di-tert-butyldicarbonate in a) and b) with a dicarbonate of formula B—O—B, wherein B has the meanings given in the following Table, to give a product that is almost identical with that of Example 1.

| Example | B |
|---|---|
| 4 | 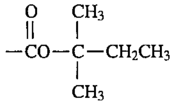 |
| 5 | 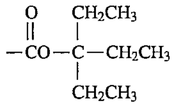 |
| 6 | 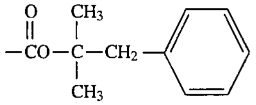 |
| 7 | 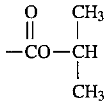 |
| 8 | 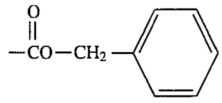 |
| 9 | 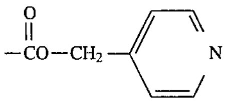 |
| 10 | 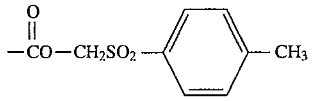 |
| 11 | 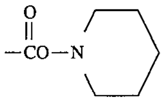 |

What is claimed is:

1. A process for the preparation of a synergistic mixture of of at least two different pigments of the quinacridone, anthraquinone, perylene, indigo, quinophthalone, isoindolinone, isoindoline, dioxazine, phthalocyanine, diketopyrrolopyrrole or azo series, which comprises mixing at least two compounds of formula $$A(B)_x, \qquad (I),$$

wherein x is an integer from 1 to 4,

A is the radical of a chromophore of the quinacridone, anthraquinone, perylene, indigo, quinophthalone, isoindolinone, isoindoline, dioxazine, phthalocyanine, diketopyrrolopyrrole or azo series, which contains x N-atoms linked to B, said N atom(s). Optionally having at least one directly adjacent or conjugated carbonyl group, B is selected from the group consisting of formulae

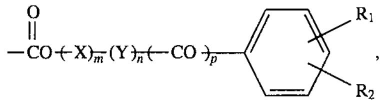

(II)

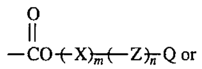

(III)

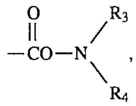

(IV)

and, when x is 2, 3 or 4, may also be one, two or three hydrogen atoms, in which formulae (II), (III) and (IV)

m, n and p are each independently of one another 0 or 1,

X is $C_1$-$C_{14}$alkylene or $C_2$-$C_8$alkenylene,

Y is a group—V—$(CH_2)_q$—,

Z is a group —V—$(CH_2)_r$—,

V is $C_3$-$C_6$cycloalkylene, q is an integer from 1 to 6, and r is an integer from 0 to 6, $R_1$ and $R_2$ are each independently of the other hydrogen, $C_1$-$C_6$alkyl, $C_1$-$C_4$alkoxy, halogen, CN, $NO_2$, unsubstimted phenyl or phenoxy or phenyl or phenoxy which are substituted by $C_1$-$C_4$alkyl, $C_1$-$C_4$alkoxy or halogen, Q is hydrogen, CN, $Si(R_1)_3$, a group $C(R_5)(R_6)(R_7)$, wherein $R_5$, $R_6$ and $R_7$ are each independently of one another hydrogen or halogen and at least one of $R_5$, $R_6$ and $R_7$ is halogen, a group

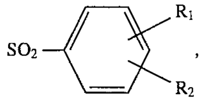

wherein $R_1$ and $R_2$ are as defined above, a group $SO_2R_8$ or $SR_8$, wherein $R_8$ is $C_1$-$C_4$alkyl, a group $CH(R_9)_2$, wherein $R_9$ is unsubstituted phenyl or phenyl which is substituted by $C_1$-$C_4$alkyl, $C_1$-$C_4$alkoxy or halogen, or a group of formula

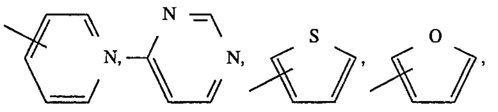

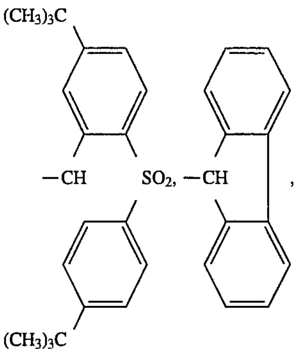

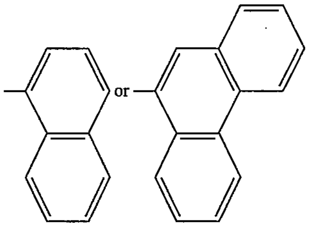

$R_3$ and $R_4$ are each independently of the other hydrogen, $C_1$-$C_{18}$alkyl, a group

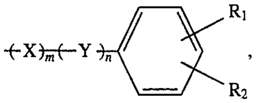

wherein X, Y, $R_1$, $R_2$, m and n are as defined above, or $R_3$ and $R_4$, together with the linking nitrogen atom, form a pyrrolidinyl, piperidinyl or morpholinyl radical, in powder form by conventional methods and dissolving the mixture in an organic solvent, or first dissolving the individual components in an organic solvent and mixing the solutions, and subsequently precipitating the pigment mixture consisting of the corresponding pigments of formula $A(H)_x$, wherein A and x have the meanings given above, from the dissolved mixture by means of a thermal, photolyric or chemical treatment.

2. A process according to claim 1, wherein x is 1 or 2 and B is selected from the group consisting of formulae

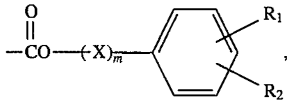

(V)

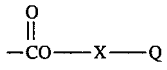

(VI) or (IV)

and, if x is 2, may also be one hydrogen atom, and in formulae IV, V and VI m isO or 1, X is $C_1$-$C_4$alkylene or $C_2$-$C_5$alkenylene, $R_1$ and $R_2$ are each independently of the other hydrogen, $C_1C_4$alkyl, methoxy, chloro or $NO_2$, and Q is hydrogen, CN, $CCl_3$, a group

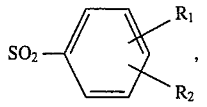

$SO_2CH_3$ or $SCH_3$, $R_3$ and $R_4$ are each independently of the other hydrogen, $C_1$-$C_4$alkyl or a group

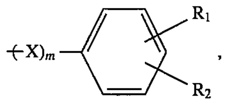

or $R_3$ and $R_4$, taken together, form a piperidinyl radical.

3. A process according to claim 1, wherein x is 2 and B is the same or different and is selected from the group consisting of the formulae

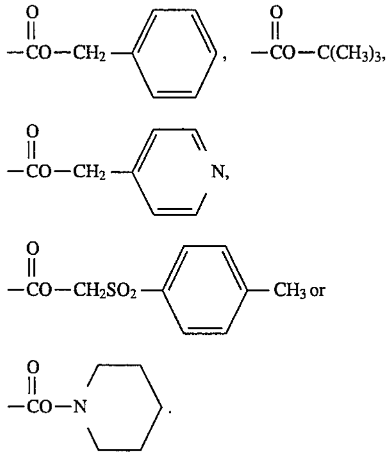

4. A process according to claim 1, wherein said two different compounds are selected from the group consisting of a) perylenecarboximides of formula

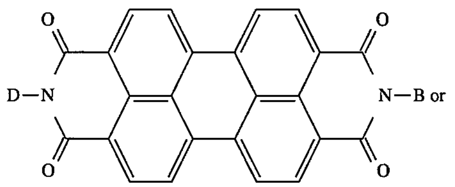

(VIIa)

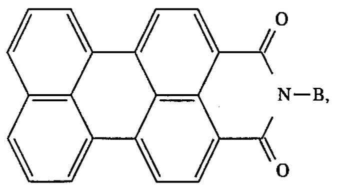

(VIIb)

wherein D is hydrogen, $C_1$-$C_6$alkyl, unsubstituted or halogen- or $C_1$-$C_4$alkyl-substituted phenyl, benzyl or phenethyl, or is B, b) quinacridones of formula

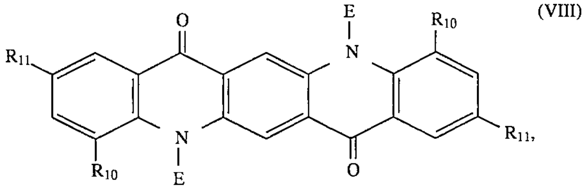

(VIII)

wherein $R_{10}$ and $R_{11}$ are each independently of the other hydrogen, halogen, $C_1$-$C_{18}$alkyl, $C_1$-$C_4$alkoxy or phenyl, c) dioxazines of formula

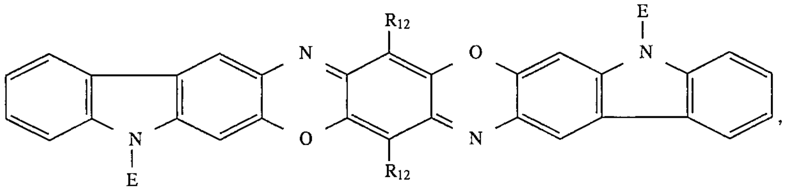

(IX)

wherein $R_{12}$ is hydrogen, halogen or $C_1$-$C_{18}$alkyl, d) isoindolines of formulae

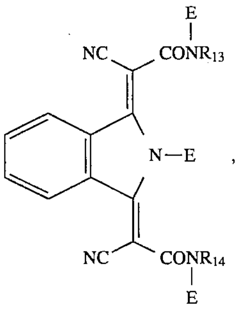

(X)

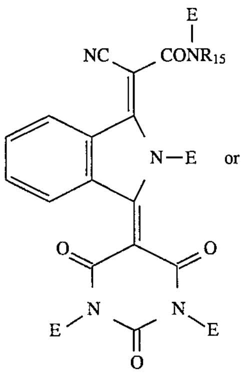

(XI)

-continued

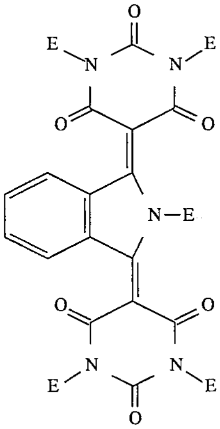

(XII)

wherein $R_{13}$ is a group

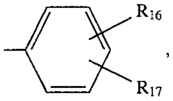

$R_{14}$ is hydrogen, $C_1$-$C_{18}$alkyl, benzyl or a group

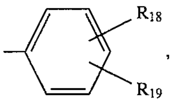

$R_{15}$ has the same meaning as $R_{13}$, $R_{16}$, $R_{17}$, $R_{18}$ and $R_{19}$ are each independently of one another hydrogen, $C_1$-$C_{18}$alkyl, $C_1$-$C_4$alkoxy, halogen or trifiuoromethyl, e) indigo derivatives of formula

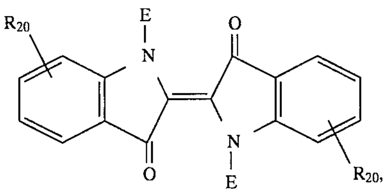

(XIII)

wherein $R_{20}$ is hydrogen, CN, $C_1$-$C_4$alkyl, $C_1$-$C_4$alkoxy or halogen, f) azobenzimidazolones of formula

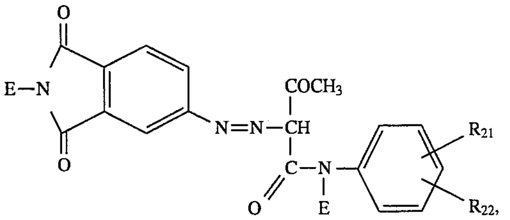

(XIV)

wherein $R_{21}$ and $R_{22}$ are each independently of the other hydrogen, halogen, $C_1$-$C_4$alkyl or $C_1C_4$alkoxy, g) anthraquinoid compounds of formula

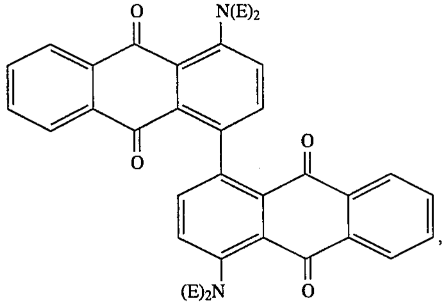

(XV)

h) phthalocyanines of formula

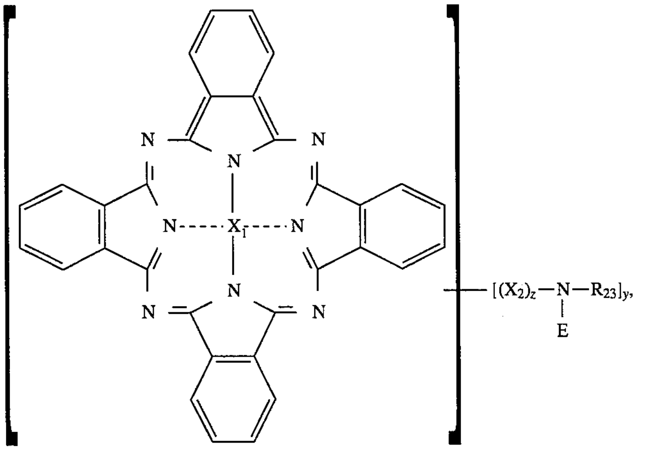

(XVI)

wherein $X_1$ is $H_2$, Zn, Cu, Ni, Fe or V, $X_2$ is —CH($R_{24}$)— or —$SO_2$—

$R_{23}$ is hydrogen, $C_1$-$C_4$alkyl, —N(E)$R_{24}$, —NHCO$R_{25}$, —CO$R_{25}$ or

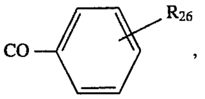

$R_{24}$ is hydrogen or $C_1C_4$alkyl, $R_{25}$ is $C_1C_4$alkyl and $R_{26}$ is hydrogen, halogen, $C_1$-$C_4$alkyl or $C_1$-$C_4$alkoxy, z is 0 or 1 and y is an integer from 1 to 4, and i) pyrrolo[3,4-c]pyrroles of formula

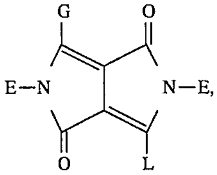

(XVII)

wherein G and L are each independently of the other a group of formula

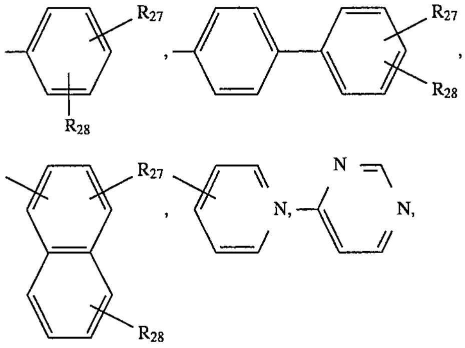

-continued

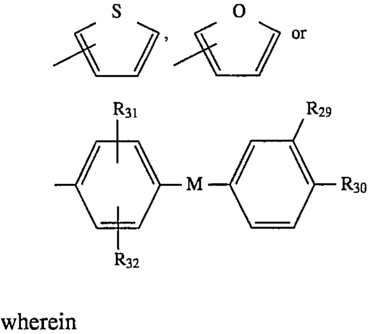

wherein $R_{27}$ and $R_{28}$ are each independently of the other hydrogen, halogen, $C_1$-$C_{18}$alkyl, $C_1$-$C_{18}$alkoxy, $C_1$-$C_{18}$alkylmercapto, $C_1$-$C_{18}$alkylamino, —CN, —$NO_2$, phenyl, trifluoromethyl, $C_5$-$C_6$cycloalkyl, —C=N—($C_1C_{18}$alkyl),

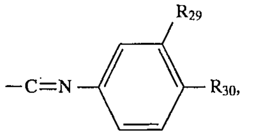

imidazolyl, pyrrazolyl, triazolyl, piperazinyl, pyrrolyl, oxazolyl, benzoxazolyl, benzothiazolyl, benzimidazolyl, morpholinyl, piperidinyl or pyrrolidinyl, M is —$CH_2$—,—$CH(CH_3)$—, —$C(CH_3)_2$—, —CH=N—, —N=N—,—O—,—S—, —SO—, —$SO_2$— or —$NR_{33}$, $R_{29}$ and $R_{30}$ are each independently of the other hydrogen, halogen, $C_1$-$C_6$alkyl, $C_1$-$C_{18}$alkoxy or —CN, $R_{31}$ and $R_{32}$ are each independently of the other hydrogen, halogen or $C_1C_6$alkyl and $R_{33}$ is hydrogen or $C_1C_6$alkyl, in each of which formulae E is hydrogen or is B, with the proviso that at least one E in each formula is B and B is as defined above.

5. A process according to claim 4, wherein at least one of the two different compounds are selected from the group consisting of a quinacridone of formula VIII, wherein $R_{10}$ and $R_{11}$ are each independently of the other hydrogen, chloro or methyl, and E is as defined above, and/or a pyrrolo[3,4-c]pyrrole of formula XVII, wherein G and L are identical and are a group of formula

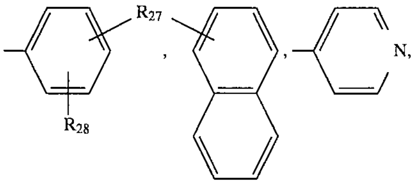

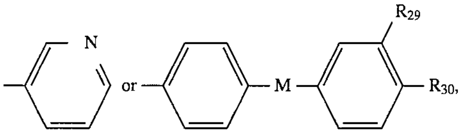

wherein $R_{27}$ and $R_{28}$ are each independently of the other hydrogen, chloro, bromo, $C_1$-$C_4$alkyl, $C_1$-$C_6$alkoxy, $C_1$-$C_6$alkylamino, CN or phenyl, M is —O—, -$NR_{33}$—, —N=N— or —$SO_2$—, $R_{29}$ and $R_{30}$ are hydrogen and $R_{33}$ is hydrogen, methyl or ethyl and E is as defined above.

6. A process according to claim 5, wherein at least one of the two different compounds are selected from the group consisting of quinacridones of formulae

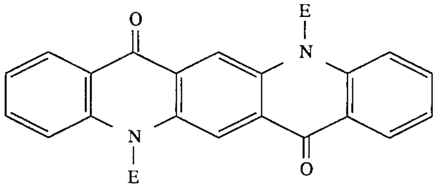

(XVIII)

and/or

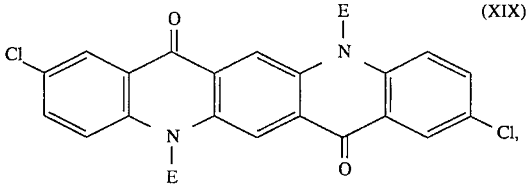

(XIX)

and/or pyrrolo[3,4-c]pyrroles of formula

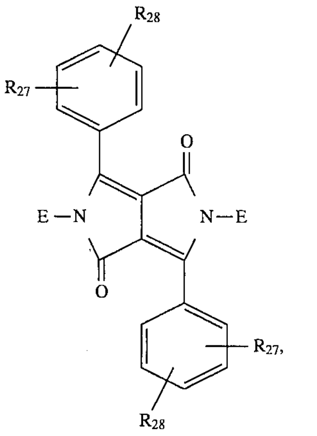

(XX)

wherein $R_{27}$ and $R_{28}$ are each independently of the other hydrogen, methyl, tert-butyl, chloro, bromo, CN or phenyl, and E in formulae XVIII, XIX and XX is a group of formula

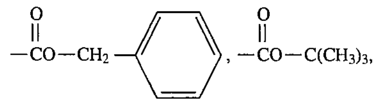

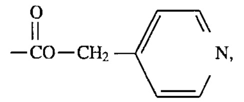

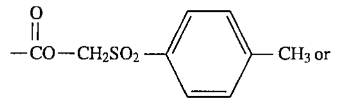

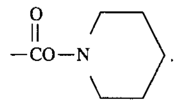

* * * * *